(12) United States Patent
Aso et al.

(10) Patent No.: US 10,840,771 B2
(45) Date of Patent: Nov. 17, 2020

(54) MOTOR, BLOWER, AIR CONDITIONER, AND METHOD OF PRODUCING MOTOR

(71) Applicant: Mitsubishi Electric Corporation, Tokyo (JP)

(72) Inventors: Hiroki Aso, Tokyo (JP); Takaya Shimokawa, Tokyo (JP); Ryogo Takahashi, Tokyo (JP); Junichiro Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 31 days.

(21) Appl. No.: 16/319,561

(22) PCT Filed: Sep. 28, 2016

(86) PCT No.: PCT/JP2016/078644
§ 371 (c)(1),
(2) Date: Jan. 22, 2019

(87) PCT Pub. No.: WO2018/061111
PCT Pub. Date: Apr. 5, 2018

(65) Prior Publication Data
US 2020/0021168 A1 Jan. 16, 2020

(51) Int. Cl.
*H02K 9/00* (2006.01)
*H02K 9/06* (2006.01)
*H02K 5/20* (2006.01)
*H02K 21/12* (2006.01)

(52) U.S. Cl.
CPC ............... *H02K 9/06* (2013.01); *H02K 5/20* (2013.01); *H02K 21/12* (2013.01)

(58) Field of Classification Search
CPC .......... H02K 9/06; H02K 11/33; H02K 5/225; H02K 3/522; H02K 5/18; H02K 9/22; H02K 11/048; H02K 2203/03; H02K 2211/03; H02K 5/02
USPC ................ 310/43, 60 R, 64, 68 R, 71, 254.1
See application file for complete search history.

(56) References Cited

U.S. PATENT DOCUMENTS

| | | | |
|---|---|---|---|
| 6,081,056 A * | 6/2000 | Takagi | H02K 5/08 310/216.137 |
| 6,394,767 B1 * | 5/2002 | Matsumoto | F04D 25/08 310/71 |
| 6,873,069 B1 * | 3/2005 | Odagiri | H01L 23/467 165/122 |
| 2007/0103101 A1 | 5/2007 | Kikuchi et al. | |
| 2008/0186682 A1 | 8/2008 | Sugimura | |

(Continued)

FOREIGN PATENT DOCUMENTS

| | | |
|---|---|---|
| CN | 1906826 A | 1/2007 |
| JP | S53-121108 A | 10/1978 |

(Continued)

OTHER PUBLICATIONS

Extended EP Search Report dated Sep. 3, 2019 issued in corresponding EP patent application No. 16917664.1.

(Continued)

*Primary Examiner* — Thanh Lam
(74) *Attorney, Agent, or Firm* — Posz Law Group, PLC (57) ABSTRACT

A motor includes a rotor, a stator assembly, a heat radiation member to radiate heat of the stator assembly, and a resin integrating the heat radiation member with the stator assembly.

19 Claims, 11 Drawing Sheets

(56) References Cited

U.S. PATENT DOCUMENTS

| | | | | |
|---|---|---|---|---|
| 2014/0311716 | A1* | 10/2014 | Yamada | H02K 11/215 165/121 |
| 2015/0183456 | A1 | 7/2015 | Nishimura | |
| 2019/0058374 | A1* | 2/2019 | Enomoto | F28D 15/0233 |
| 2019/0115798 | A1* | 4/2019 | Ishii | F24F 1/0018 |
| 2019/0386530 | A1* | 12/2019 | Takahashi | H02K 1/27 |
| 2020/0195104 | A1* | 6/2020 | Bulatow | H02J 50/10 |

FOREIGN PATENT DOCUMENTS

| | | |
|---|---|---|
| JP | H07-194173 A | 7/1995 |
| JP | H08-275432 A | 10/1996 |
| JP | H09-308174 A | 11/1997 |
| JP | H11-166500 A | 6/1999 |
| JP | 2006-033986 A | 2/2006 |
| JP | 2007-267568 A | 10/2007 |
| JP | 2008-078271 A | 4/2008 |
| JP | 2008-091522 A | 4/2008 |
| JP | 2008-160918 A | 7/2008 |
| JP | 2008-253049 A | 10/2008 |
| JP | 2010-058182 A | 3/2010 |
| JP | 2012-57583 A | 3/2012 |
| JP | 2015-126100 A | 7/2015 |
| JP | 5766292 B2 | 8/2015 |
| KR | 10-2006-0089749 A | 8/2006 |
| KR | 10-2011-0039785 A | 4/2011 |
| KR | 10-1051440 B1 | 4/2011 |

OTHER PUBLICATIONS

Office Action dated Mar. 19, 2020 issued in corresponding Korean patent application No. 10-2019-7003117(and English translation).
Office Action dated Oct. 29, 2019 issued in corresponding JP patent application No. 2018-541776 (and English translation).
Office Action dated May 5, 2020 issued in corresponding KR patent application No. 10-2019-7003117 (and English translation).
Office Action dated Sep. 27, 2019 issued in corresponding KR patent application No. 10-2019-7003117 (and English translation).
International Search Report of the International Searching Authority dated Dec. 20, 2016 for the corresponding international application No. PCT/JP2016/078644 (and English translation).
Office Action dated May 11, 2020 issued in corresponding CN patent application No. 201680088623.6 (and English translation).
Office action dated Jul. 30, 2019 issued in corresponding JP patent application No. 2018-541776 (and English machine translation thereof).
Office Action dated Sep. 16, 2020 issued in corresponding CN patent application No. 201680088623.6 (and English translation).

* cited by examiner

MOTOR, BLOWER, AIR CONDITIONER, AND METHOD OF PRODUCING MOTOR

CROSS REFERENCE TO RELATED APPLICATION

This application is a U.S. national stage application of International Patent Application No. PCT/JP2016/078644 filed on Sep. 28, 2016, the disclosure of which is incorporated herein by reference.

TECHNICAL FIELD

The present invention relates to a motor including a heat radiation member.

BACKGROUND ART

A heat sink as a heat radiation member is generally used to radiate heat of a motor to the outside. For example, there has been proposed a motor equipped with a heat sink attached along the outer periphery of a casing (see Patent Reference 1, for example).

PATENT REFERENCE

Patent Reference 1: Japanese Patent Application Publication No. 2008-160918

However, in the case where the heat sink is attached to the motor along the outer periphery of the casing, there is a problem in that the distance from a stator or a printed circuit board in the motor to the heat sink is long and the heat of the motor cannot be efficiently radiated to the outside.

SUMMARY

It is an object of the present invention to provide a motor capable of increasing heat radiation efficiency.

A motor according to the present invention includes a rotor, a stator assembly including a stator and a printed circuit board, a heat radiation member to radiate heat of the stator assembly, and a resin integrating the printed circuit board with the stator and integrating the heat radiation member with the stator assembly.

According to the present invention, the heat radiation efficiency of the motor can be increased.

DETAILED DESCRIPTION

First Embodiment

A motor 1 according to a first embodiment of the present invention will be described below.

In an xyz orthogonal coordinate system shown in each drawing, a z-axis direction (z-axis) represents a direction parallel to an axis line A1 (shaft center) of a shaft 22 of the motor 1 (referred to also as an "axial direction"), an x-axis direction (x-axis) represents a direction orthogonal to the z-axis direction (z-axis), and a y-axis direction represents a direction orthogonal to both of the z-axis direction and the x-axis direction.

Figure 1:
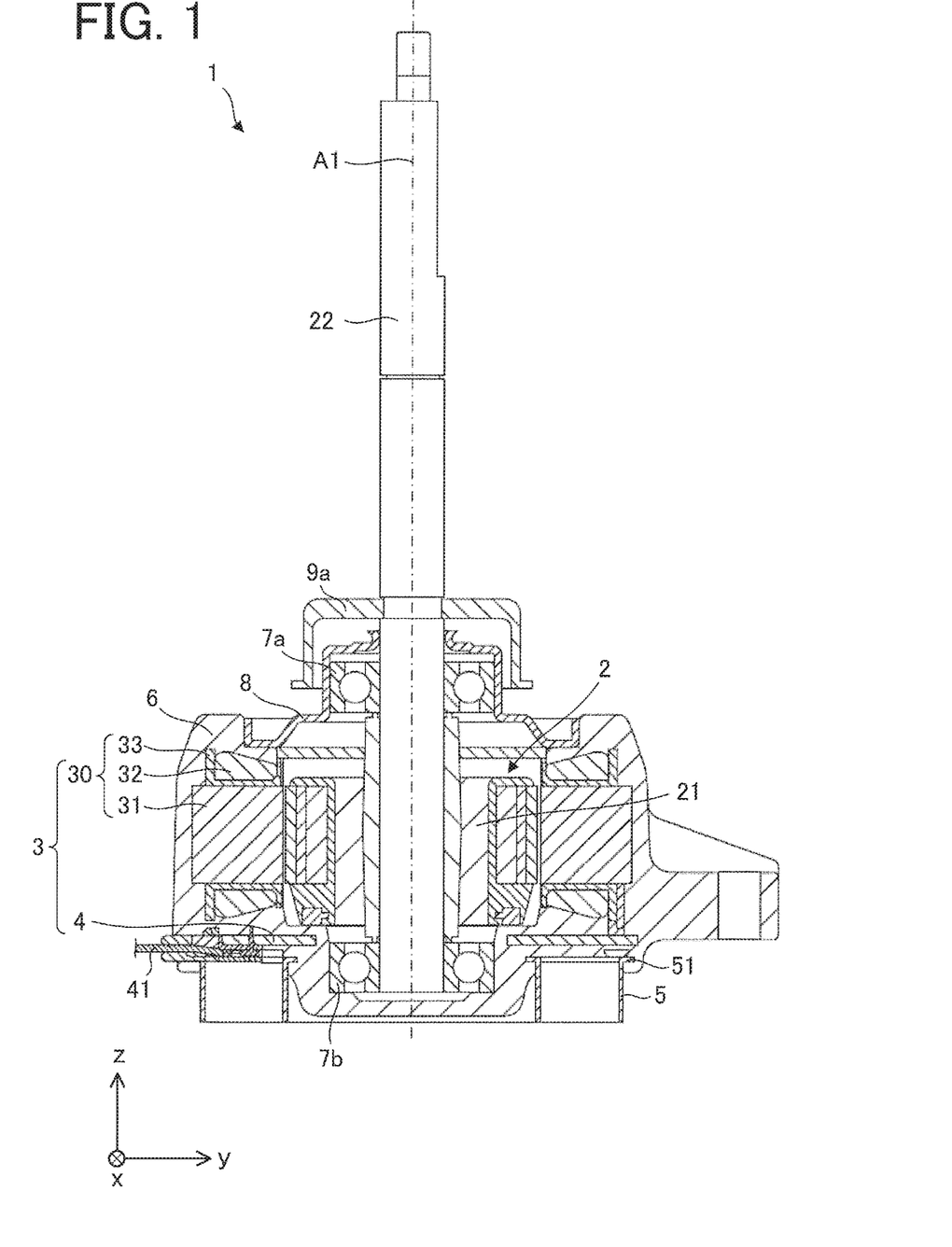
FIG. 1 is a cross-sectional view schematically showing a structure of a motor according to a first embodiment of the present invention.

FIG. 1 is a cross-sectional view schematically showing a structure of the motor 1 according to the first embodiment of the present invention.

Figure 2:
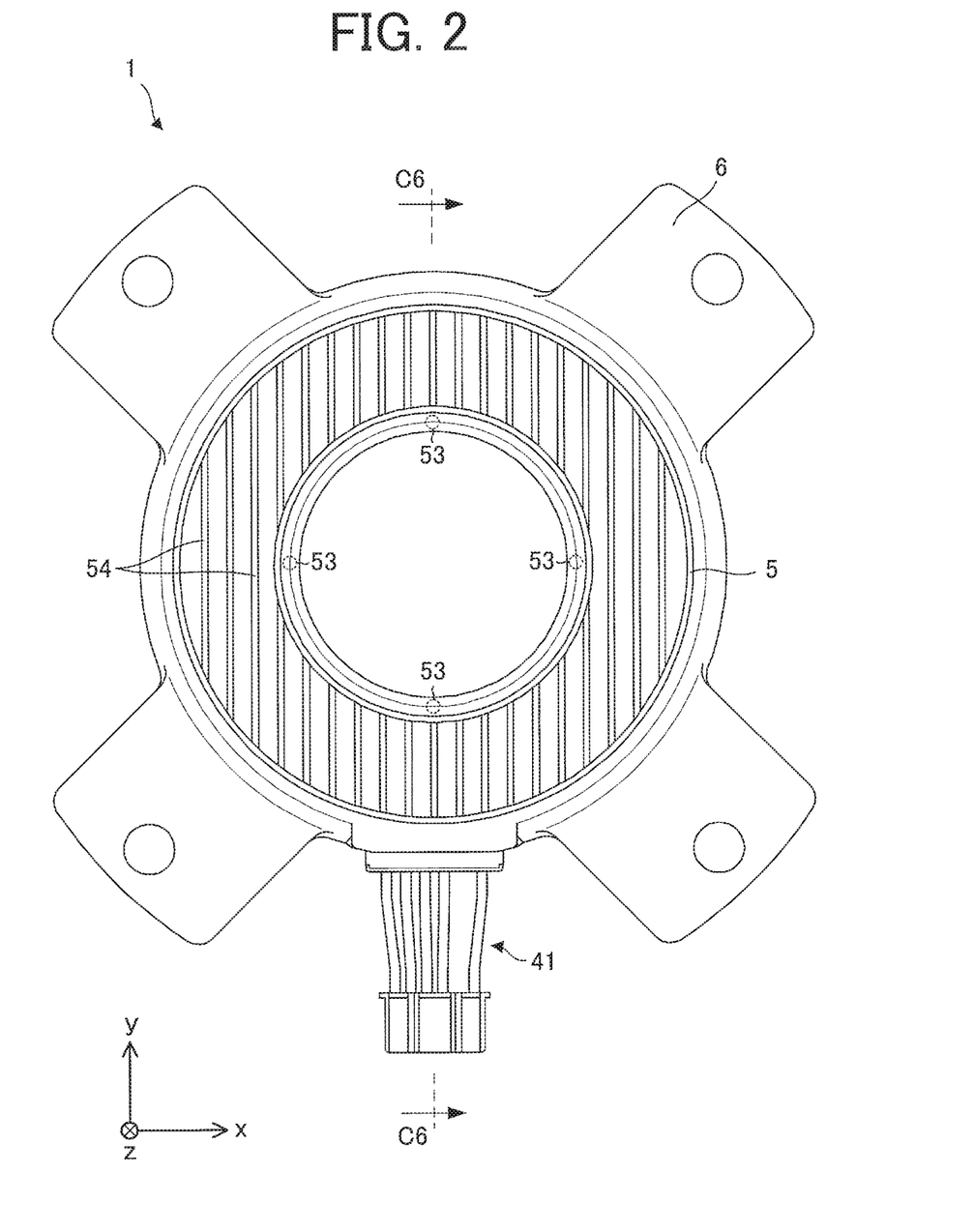
FIG. 2 is a front view schematically showing the structure of the motor.

FIG. 2 is a front view schematically showing the structure of the motor 1.

The motor 1 (referred to also as a mold motor) includes a rotor 2 (referred to also as a rotor assembly), a stator assembly 3, a heat sink 5 as a heat radiation member, a resin 6, and bearings 7a and 7b. In the example shown in FIG. 1, the motor 1 further includes a bracket 8 and watertight rubber 9a sealing up the motor 1. The motor 1 is a permanent magnet synchronous motor, for example, but is not limited to this type. The bearings 7a and 7b rotatably support both ends of the shaft 22 of the rotor 2.

The rotor 2 includes a rotor core 21 and the shaft 22. The rotor 2 is rotatable around a rotation axis (axis line A1). The rotor 2 is rotatably arranged inside the stator assembly 3 (specifically, a stator 30) with a gap in between. The rotor 2 may further include a permanent magnet for forming magnetic poles of the rotor 2.

Figure 3:
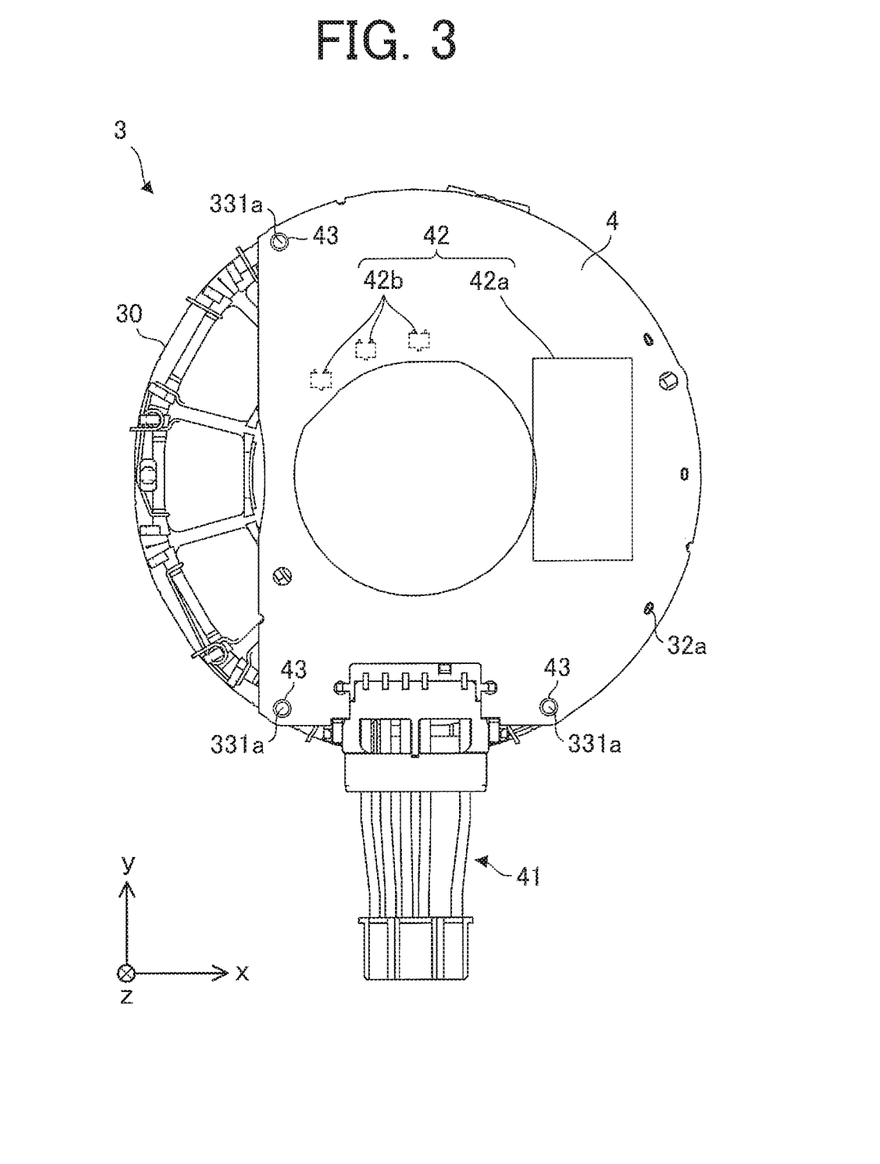
FIG. 3 is a front view schematically showing a structure of a stator assembly.

FIG. 3 is a front view schematically showing a structure of the stator assembly 3.

The stator assembly 3 includes the stator 30, a printed circuit board 4, lead wires 41 connected to the printed circuit board 4, and a drive circuit 42 fixed on a surface of the printed circuit board 4.

Figure 4:
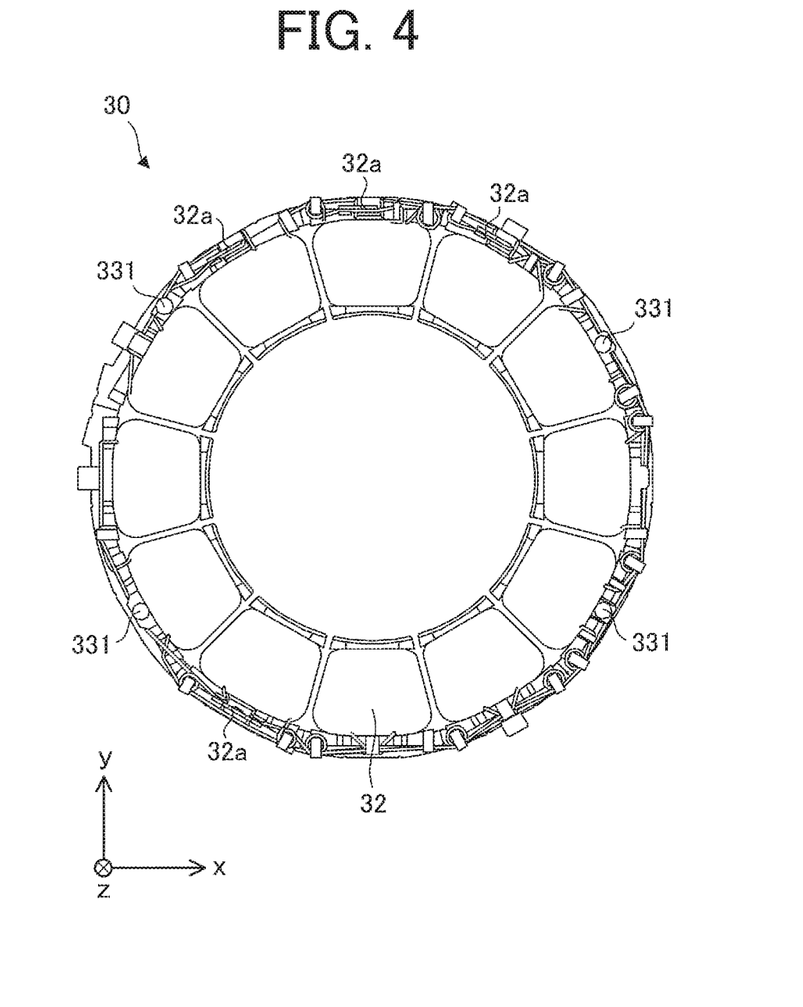
FIG. 4 is a front view schematically showing a structure of a stator.

FIG. 4 is a front view schematically showing a structure of the stator 30.

Figure 5:
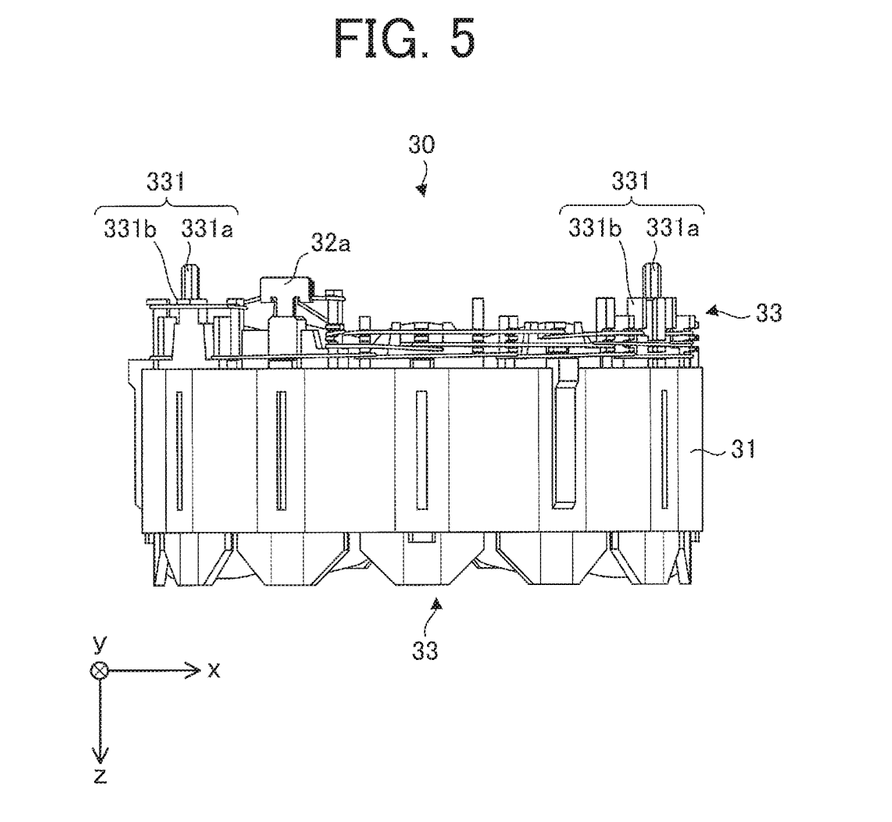
FIG. 5 is a side view schematically showing the structure of the stator.

FIG. 5 is a side view schematically showing the structure of the stator 30.

Figure 6:
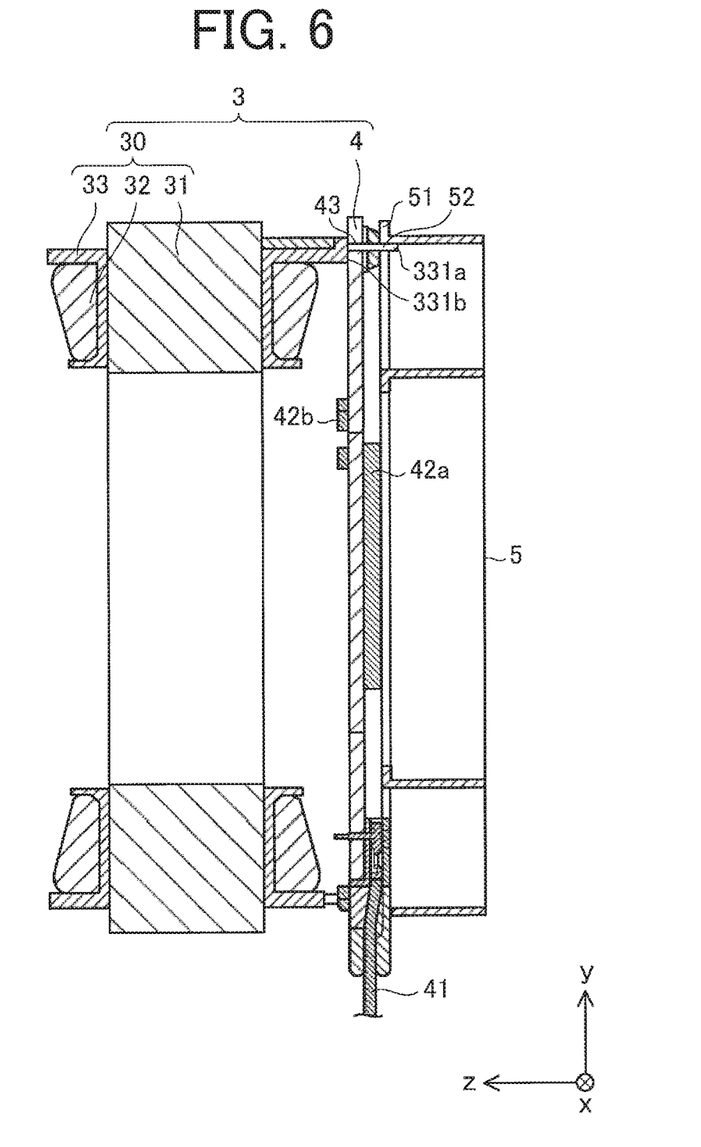
FIG. 6 is a cross-sectional view taken along the line C6-C6 shown in FIG. 2.

FIG. 6 is a cross-sectional view taken along the line C6-C6 shown in FIG. 2.

The stator 30 includes a stator core 31 made of a plurality of electromagnetic steel sheets stacked in the axial direction, a winding 32 (referred to also as a "stator winding"), and an insulator 33 as an insulation part. The plurality of electromagnetic steel sheets, each of which has been formed in a predetermined shape by a punch out process, are fixed together by means of crimping, welding, adhesion or the like.

The insulator 33 is a thermoplastic resin such as PBT (polybutylene terephthalate), for example. The insulator 33 insulates the stator core 31 (e.g., tooth parts of the stator core 31). The insulator 33 is molded integrally with the stator core 31, for example. However, it is also possible to previously mold the insulator 33 and combine the molded insulator 33 with the stator core 31.

The winding 32 is magnet wire, for example. The winding 32 is wound around the insulator 33 combined with the stator core 31, and thus a coil is formed. The winding 32 is electrically connected to a terminal 32a (winding terminal). In the example shown in FIG. 5, an end part of the winding 32 is hooked on a hook part of the terminal 32a and fixed to the terminal 32a by fusing, soldering, or the like. The terminal 32a is fixed to the insulator 33 and is electrically connected to the printed circuit board 4.

The insulator 33 insulates the stator core 31 electrically. The insulator 33 includes at least one fixing part 331 for fixing the heat sink 5.

The fixing part 331 includes a projection 331a and a support part 331b. The projection 331a is inserted into an attachment hole 52 formed in the heat sink 5 and a positioning hole 43 formed in the printed circuit board 4 (FIG. 6). Accordingly, the heat sink 5 and the printed circuit board 4 are fixed to the insulator 33. The support part 331b supports the heat sink 5 and the printed circuit board 4 in the axial direction and positions the heat sink 5 and the printed circuit board 4 in the axial direction.

The printed circuit board 4 is integrated with the stator 30 and the heat sink 5 by the resin 6 (FIG. 1). The drive circuit 42 controls the rotation of the rotor 2. The drive circuit 42 includes a drive element 42a and Hall ICs (Integrated Circuits) 42b, for example.

The drive element 42a is a power transistor, for example. The drive element 42a is electrically connected to the winding 32 and supplies drive current, according to an electric current supplied from the outside or inside (e.g., battery) of the motor 1, to the winding 32. By this operation, the drive element 42a controls the rotation of the rotor 2. In the example shown in FIG. 6, the drive element 42a is fixed on a surface of the printed circuit board 4 so as to face the heat sink 5.

For example, the Hall ICs 42b detect the rotational position of the rotor 2 by detecting the magnetic field from the rotor 2.

The printed circuit board 4 has the positioning hole 43 (also referred to simply as a "hole") to engage with the fixing part 331 (specifically, the projection 331a).

The heat sink 5 is fixed to one side of the motor 1 in the axial direction. The heat sink 5 is formed of aluminum, for example. The heat sink 5 touches the stator assembly 3 and radiates the heat of the stator assembly 3 (e.g., heat generated in the stator 30 or the drive circuit 42) outside the motor 1. However, the heat sink 5 does not necessarily have to touch the stator assembly 3. In the example shown in FIG. 6, the heat sink 5 touches the drive element 42a. The heat sink 5 may touch the printed circuit board 4. A part of the heat sink 5 (e.g., fins 54 shown in FIG. 2) is exposed outside the resin 6. Accordingly, the heat generated in the stator assembly 3 is radiated outside the motor 1.

The heat sink 5 has a flange 51 to engage with the resin 6. The flange 51 is engaged with the resin 6, and thus displacement in the axial direction is prevented. Further, since the flange 51 is engaged with the resin 6, detachment of the heat sink 5 from the motor 1 can be prevented.

The heat sink 5 further has the attachment hole 52 (also referred to simply as a "hole") to engage with the fixing part 331 (specifically, the projection 331a) (FIG. 6).

Further, as shown in FIG. 2, the heat sink 5 may have injection holes 53 into which the material of the resin 6 such as thermosetting resin is injected in the production process of the resin 6. A plurality of fins 54 are formed on the heat sink 5. However, it is also possible to use a structure having no fins 54 formed thereon as the heat sink 5. While the heat sink 5 is in a cylindrical shape in this embodiment, the shape of the heat sink 5 is not limited to the cylindrical shape.

The resin 6 integrates the heat sink 5 with the stator assembly 3. The resin 6 is thermosetting resin such as BMC (Bulk Molding Compound), for example. BMC enables low-pressure molding and thus is suitable for insert molding. Accordingly, deformation of inserts such as the printed circuit board 4 and the stator 30 can be prevented at the time of molding the resin 6 by use of a mold, and thus the quality of the motor 1 can be improved.

The resin 6 may also be implemented by thermoplastic resin such as PPS (polyphenylene sulfide). PPS increases thermal conductivity compared with BMC, and thus the heat of the stator assembly 3 is transmitted to the heat sink 5 more efficiently. Accordingly, heat radiation performance of the motor 1 improves and a rise in temperature of the printed circuit board 4 and the winding 32 can be prevented.

Figure 7:
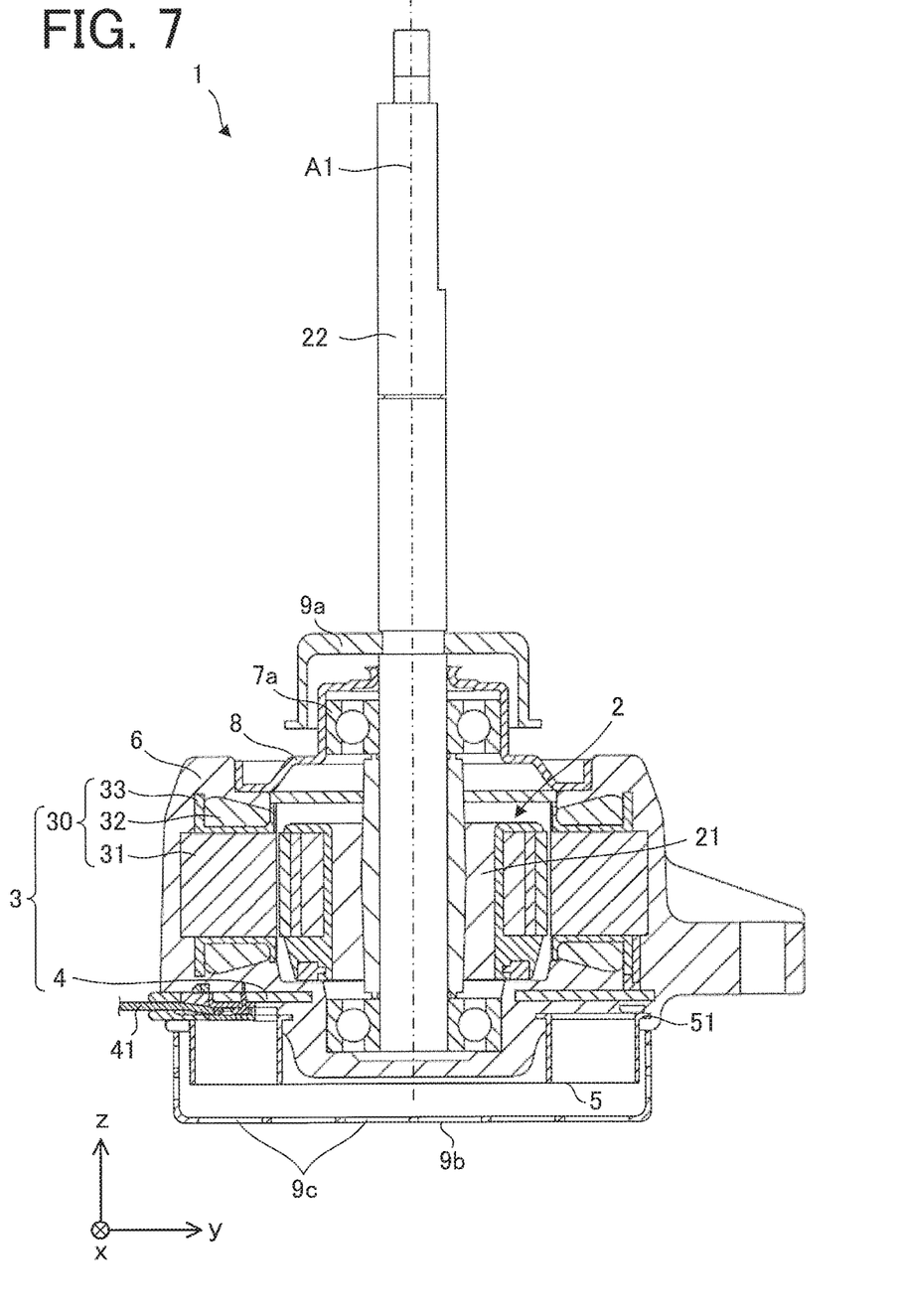
FIG. 7 is a cross-sectional view schematically showing a structure of a cover attached to the motor.

FIG. 7 is a cross-sectional view schematically showing a structure of a cover 9b attached to the motor 1.

As shown in FIG. 7, the motor 1 may have the cover 9b covering the heat sink 5. In the example shown in FIG. 7, the cover 9b is attached to the resin 6. The cover 9b has a plurality of openings 9c. The heat radiated from the heat sink 5 is discharged outside the motor 1 through the openings 9c. The cover 9b is capable of protecting the heat sink 5 and preventing a user of the motor 1 from touching the heat sink 5.

Modification

Figure 8:
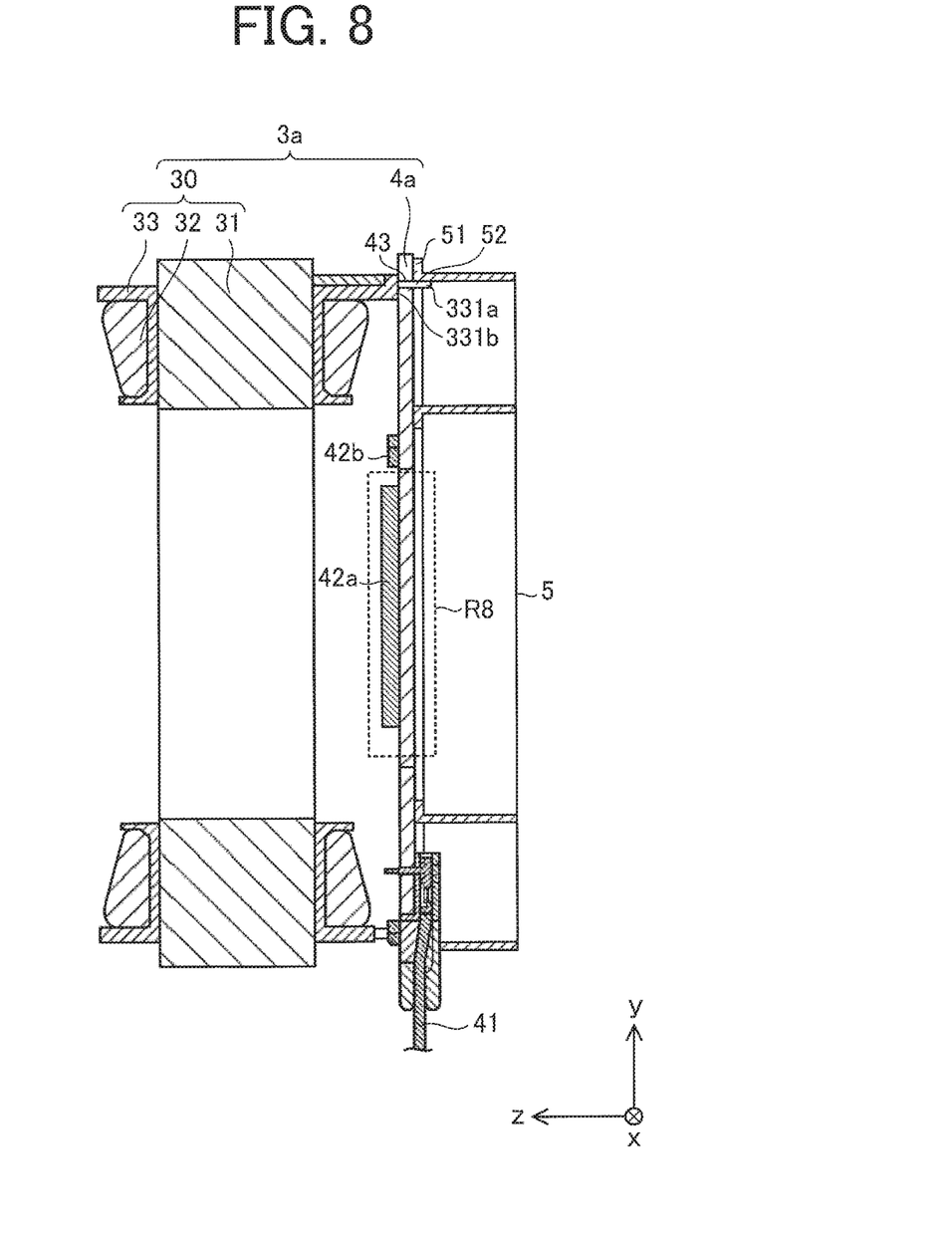
FIG. 8 is a cross-sectional view schematically showing a structure of a stator assembly and a heat sink of a motor according to a modification.

FIG. 8 is a cross-sectional view schematically showing a structure of a stator assembly 3a and a heat sink 5 of a motor according to a modification.

The cross section of the stator assembly 3a and the heat sink 5 shown in FIG. 8 corresponds to the cross section along the line C6-C6 shown in FIG. 2.

Figure 9A:
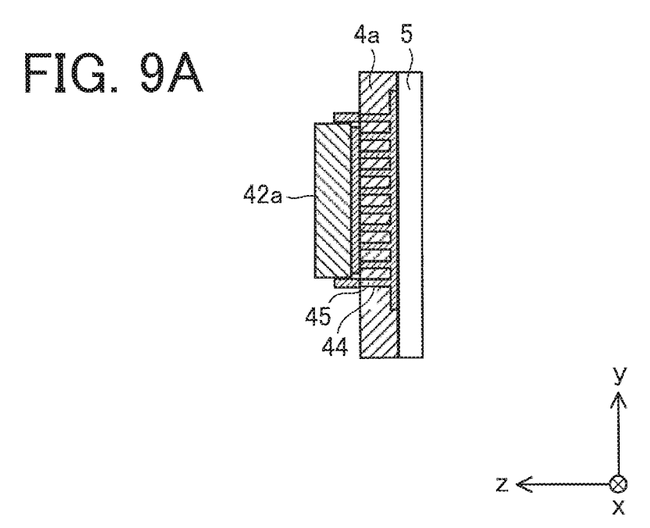
FIGS. 9A and 9B are enlarged views showing a region R8 indicated by broken lines in FIG. 8.
Figure 9B:
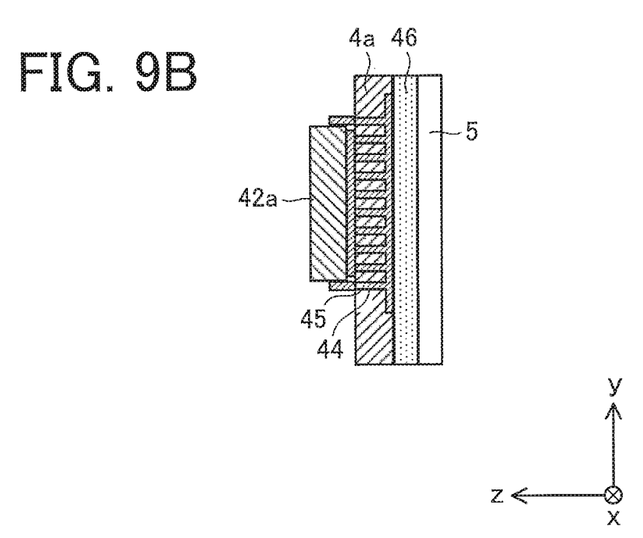

FIGS. 9A and 9B are enlarged views showing a region R8 indicated by broken lines in FIG. 8.

In this modification, each component identical or corresponding to a component described in the first embodiment is assigned the same reference character as in the first embodiment.

The motor according to the modification differs from the motor 1 according to the first embodiment in including the stator assembly 3a instead of the stator assembly 3. Further, in the modification, the heat sink 5 touches a printed circuit board 4a and a metallic wiring pattern 45. The heat sink 5 may also touch the metallic wiring pattern 45 without touching the printed circuit board 4a. The other features of the motor according to the modification are the same as those of the motor 1 according to the first embodiment.

The stator assembly 3a includes the printed circuit board 4a instead of the printed circuit board 4 and further includes the metallic wiring pattern 45. In the example shown in FIG. 8, the drive element 42a is fixed on a surface of the printed circuit board 4a so as to face the stator 30.

The printed circuit board 4a is a double-sided circuit board having at least one through hole 44. The metallic wiring pattern 45 includes a copper pattern for heat radiation, for example. The metallic wiring pattern 45 may also be a wiring pattern formed of material other than copper.

The metallic wiring pattern 45 is formed on both sides (a first surface and a second surface) of the printed circuit board 4a and in the through hole 44. The metallic wiring pattern 45 formed on a surface (the first surface) of the printed circuit board 4a facing the stator 30 (first metallic wiring pattern) touches the drive element 42a, while the metallic wiring pattern 45 formed on a surface (the second surface opposite to the first surface) of the printed circuit board 4a facing the heat sink 5 (second metallic wiring pattern) touches the heat sink 5. The metallic wiring patterns 45 formed on the both sides (the first surface and the second surface) of the printed circuit board 4a (the first and second metallic wiring patterns) are connected to each other with the through hole 44 in between. Accordingly, the heat of the stator assembly 3a is transmitted from the metallic wiring pattern 45 formed on the surface of the printed circuit board 4a facing the stator 30 to the heat sink 5 through the through hole 44 and is radiated outside the motor.

A solder resist is formed on the surface of the printed circuit board 4a facing the heat sink 5. Accordingly, the surface of the printed circuit board 4a is electrically insulated from the heat sink 5. To electrically insulate the surface of the printed circuit board 4a, it is also possible to attach an insulating material such as a PET (polyethylene terephthalate) film on the surface of the printed circuit board 4a facing the heat sink 5.

As shown in FIG. 9B, the stator assembly 3a of the motor according to the modification may include a heat radiation auxiliary member 46. The heat radiation auxiliary member 46 is arranged between the heat sink 5 and the printed circuit board 4a. In the example shown in FIG. 9B, the heat radiation auxiliary member 46 touches the heat sink 5, the printed circuit board 4a and the metallic wiring pattern 45. Accordingly, the heat sink 5 sticks firmly to the printed circuit board 4a and the metallic wiring pattern 45 with the heat radiation auxiliary member 46 in between and the distance from the stator assembly 3a to the heat sink 5 is reduced, and thus the heat transmission from the stator assembly 3a, specifically, the metallic wiring pattern 45, to the heat sink 5 is facilitated. Since the heat radiation auxiliary member 46 transmits the heat of the stator assembly 3a to the heat sink 5, it is preferable that the heat radiation auxiliary member 46 excel in the heat radiation performance, and it is more preferable that the heat radiation auxiliary member 46 excel in the heat radiation performance better than BMC.

It is also possible to arrange the heat radiation auxiliary member 46, formed by using a high thermal conductivity material such as silicone abundantly filled with ceramics filler, between the printed circuit board 4a and the heat sink 5 without forming the solder resist or the PET film on the printed circuit board 4a. Accordingly, the heat can be radiated efficiently while electrically insulating the printed circuit board 4a.

The heat radiation auxiliary member 46 can be formed in a sheet-like shape or a block-like shape, for example. Using a low hardness material as the material of the heat radiation auxiliary member 46 facilitates sticking the heat sink 5 firmly to the stator assembly 3a. Accordingly, the heat of the stator assembly 3a can be transmitted to the heat sink 5 with high efficiency. However, the thermal conductivity generally increases with the increase in the hardness of the material, and thus it is desirable to employ an appropriate material as the material of the heat radiation auxiliary member 46.

In the following, an example of a method of producing the motor 1 will be described.

Figure 10:
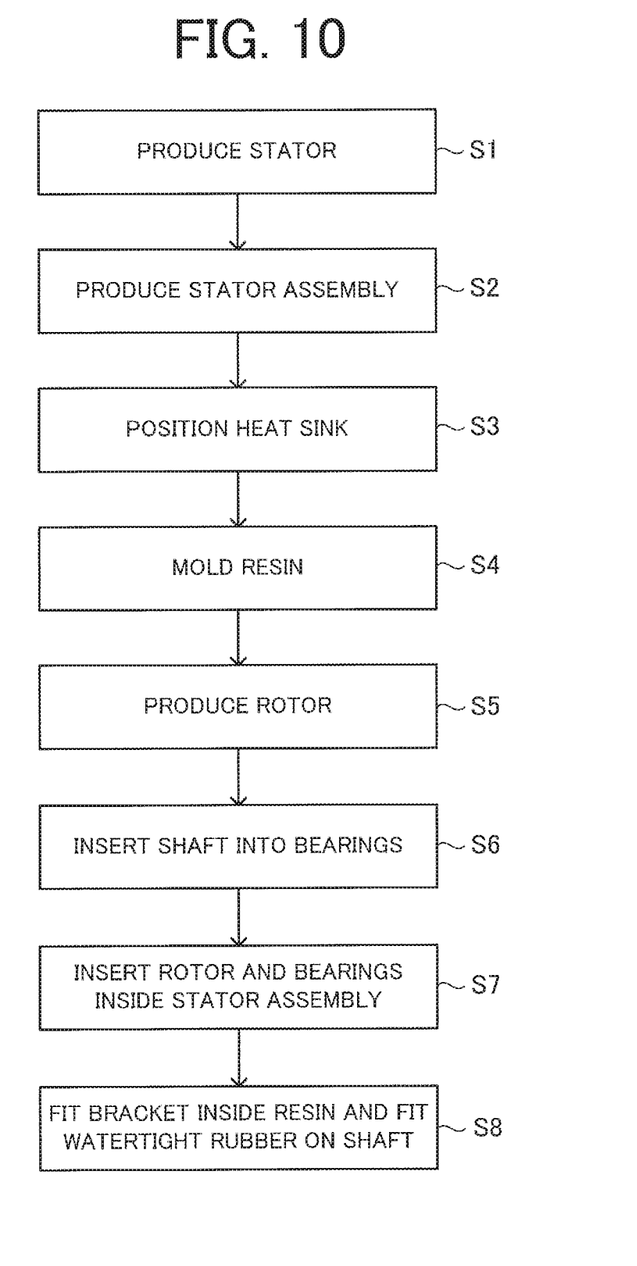
FIG. 10 is a flowchart showing an example of processes of producing the motor.

FIG. 10 is a flowchart showing an example of processes of producing the motor 1. The method of producing the motor 1 includes steps described below.

In step S1, the stator 30 is produced. The stator core 31 is formed by stacking a plurality of electromagnetic steel sheets in the axial direction, for example. Further, a previously formed insulator 33 is attached to the stator core 31, and the winding 32 is wound around the stator core 31 and the insulator 33. Accordingly, the stator 30 is obtained.

In step S2, the stator assembly 3 is produced. For example, the projection 331a of the insulator 33 is inserted into the positioning hole 43 of the printed circuit board 4. In this case, the printed circuit board 4 is pressed against the support part 331b. Accordingly, the printed circuit board 4 is positioned appropriately and the stator assembly 3 is obtained. The drive circuit 42 is previously fixed on a surface of the printed circuit board 4. The lead wires 41 are also desired to be previously attached to the printed circuit board 4. The projection 331a projecting from the positioning hole 43 may be fixed to the printed circuit board 4 by means of thermal welding, ultrasonic welding or the like.

In step S3, the heat sink 5 is positioned. Specifically, the projection 331a projecting from the positioning hole 43 is inserted into the attachment hole 52 of the heat sink 5. Namely, the projection 331a is inserted into the positioning hole 43 and the attachment hole 52. Accordingly, the heat sink 5 is positioned appropriately and attached to the stator assembly 3. The projection 331a projecting from the positioning hole 43 and the attachment hole 52 may be fixed to the heat sink 5 by means of thermal welding, ultrasonic welding or the like. Accordingly, the heat sink 5 can be firmly fixed to the stator assembly 3. In this case, the thermal welding or ultrasonic welding of the projection 331a projecting from the positioning hole 43 and the attachment hole 52 in the step S3 may be performed without performing the thermal welding or ultrasonic welding of the projection 331a in the step S2.

In step S4, the heat sink 5 is integrated with the stator assembly 3 by using the resin 6. In other words, the heat sink 5 and the stator assembly 3 are connected to each other by integral molding. For example, the stator assembly 3 and the heat sink 5 are arranged in a mold, and the material of the resin 6 (e.g., thermosetting resin such as BMC) is injected into the injection holes 53 formed in the heat sink 5. The resin 6 is formed to cover the flange 51 of the heat sink 5. Accordingly, the flange 51 engages with the resin 6. Further, the resin 6 is formed so that a part of the heat sink 5 (e.g., the fins 54) is exposed outside the resin 6.

In step S5, the rotor 2 is produced. For example, the rotor 2 is obtained by inserting the shaft 22 into a shaft hole formed in the rotor core 21. A permanent magnet for forming magnetic poles may be previously attached to the rotor core 21.

In step S6, the shaft 22 is inserted into the bearings 7a and 7b.

The order of the steps from the step S1 to the step S6 is not limited to the order shown in FIG. 10. For example, the step S5 and the steps from the step S1 to the step S4 can be executed in parallel with each other. The step S5 may be executed prior to the steps from the step S1 to the step S4.

In step S7, the rotor 2 is inserted inside the stator assembly 3 produced in the steps S1 to S4 (specifically, the stator 30) together with the bearings 7a and 7b.

In step S8, the bracket 8 is fitted inside the resin 6, and the watertight rubber 9a is fitted on the shaft 22.

The motor 1 is assembled by the process described above.

Advantages of the motor 1 according to the first embodiment (including advantages of the modification) and advantages of the method of producing the motor 1 will be described below.

In the motor 1 according to the first embodiment, the heat sink 5 and the stator assembly 3 are formed integrally, and thus the distance from the stator assembly 3 to the heat sink 5 is reduced and the heat radiation efficiency of the motor 1 can be increased.

Since the printed circuit board 4 is integrated with the heat sink 5 by the resin 6, even when the temperature of the printed circuit board 4 rises, the heat of the printed circuit board 4 is transmitted to the resin 6 and then transmitted from the resin 6 to the heat sink 5. Accordingly, the heat of the printed circuit board 4 can be radiated outside the motor 1.

In the case where the thermal conductivity of the resin 6 is high, the heat of the stator assembly 3 can be efficiently transmitted to the heat sink 5.

Further, when the heat sink 5 touches the stator assembly 3, the heat of the stator assembly 3 can be efficiently radiated outside the motor 1. Since heat is likely to be generated in the drive circuit 42, the heat generated in the drive circuit 42 can be efficiently radiated outside the motor 1 when the heat sink 5 touches the drive circuit 42 (e.g., the drive element 42a).

When a part of the heat sink 5 (e.g., the fins 54) is exposed outside the resin 6, the heat generated in the stator assembly 3 can be efficiently radiated outside the motor 1.

The heat sink 5 has the attachment hole 52 to engage with the fixing part 331 (specifically, the projection 331a), and the projection 331a of the insulator 33 is inserted in the attachment hole 52. This enables the positioning of the heat sink 5 with respect to the stator assembly 3, and thus accuracy of attaching the heat sink 5 can be increased.

The printed circuit board 4 has the positioning hole 43 to engage with the fixing part 331 (specifically, the projection 331a), and the projection 331a of the insulator 33 is inserted in the positioning hole 43. This enables the positioning of the printed circuit board 4 with respect to the stator 30, and thus accuracy of attaching the printed circuit board 4 can be increased.

The heat sink 5 has the flange 51 to engage with the resin 6. Since the flange 51 is covered by the resin 6, the heat sink 5 can be fixed firmly. Further, when the attachment hole 52 of the heat sink 5 is filled with the resin 6, the heat sink 5 can be fixed more firmly. This makes it possible to leave out parts for fixing the heat sink 5, such as screws, and a screw threading process, and thus the cost for the motor 1 can be reduced.

Furthermore, when the injection holes 53 formed in the heat sink 5 are filled with the resin 6, the heat sink 5 can be fixed more firmly. Accordingly, detachment of the heat sink 5 from the motor 1 (specifically, the resin 6) can be prevented.

In the case where the motor 1 has the cover 9b covering the heat sink 5, the heat sink 5 can be protected and the user of the motor 1 can be prevented from touching the heat sink 5.

In the modification, when the heat sink 5 touches the printed circuit board 4a as shown in FIG. 8, even when the temperature of the printed circuit board 4a rises, the heat of the printed circuit board 4a can be efficiently radiated outside the motor 1.

In the example shown in FIG. 8, the drive element 42a, as an electronic component large-sized in the axial direction, is fixed on a surface of the printed circuit board 4a so as to face the stator 30, and thus the heat sink 5 can be placed closer to the stator assembly 3 as compared with the motor 1 according to the first embodiment. Accordingly, the heat of the stator assembly 3 is transmitted to the heat sink 5 more efficiently and the heat radiation efficiency of the motor can be increased.

Further, in the modification, the printed circuit board 4a has the through hole 44, and the heat sink 5 touches the metallic wiring pattern 45. Accordingly, the heat of the stator assembly 3a can be efficiently transmitted to the heat sink 5 through the metallic wiring pattern 45.

When the heat radiation auxiliary member 46 is arranged between the heat sink 5 and the printed circuit board 4a as shown in FIG. 9B, the heat sink 5 sticks firmly to the printed circuit board 4a and the metallic wiring pattern 45 with the heat radiation auxiliary member 46 in between and the distance from the stator assembly 3a to the heat sink 5 is reduced, and thus the heat transmission from the stator assembly 3a to the heat sink 5 is facilitated.

With the method of producing the motor 1 according to the first embodiment, the heat sink 5 can be integrated with the stator assembly 3 so as to reduce the distance from the stator assembly 3 to the heat sink 5, and thus the motor 1 with increased heat radiation efficiency can be produced.

By inserting the projection 331a of the insulator 33 into the positioning hole 43 and the attachment hole 52 and performing the thermal welding or ultrasonic welding of the projection 331a, processes for fixing the printed circuit board 4 and the heat sink 5 can be carried out at the same time. Accordingly, the processing cost can be reduced.

By injecting the material of the resin 6 into the injection holes 53 formed in the heat sink 5, the heat sink 5 can be integrated with the stator assembly 3 and the injection holes 53 can be filled with the resin 6.

Second Embodiment

An air conditioner 10 according to a second embodiment of the present invention will be described below.

Figure 11:
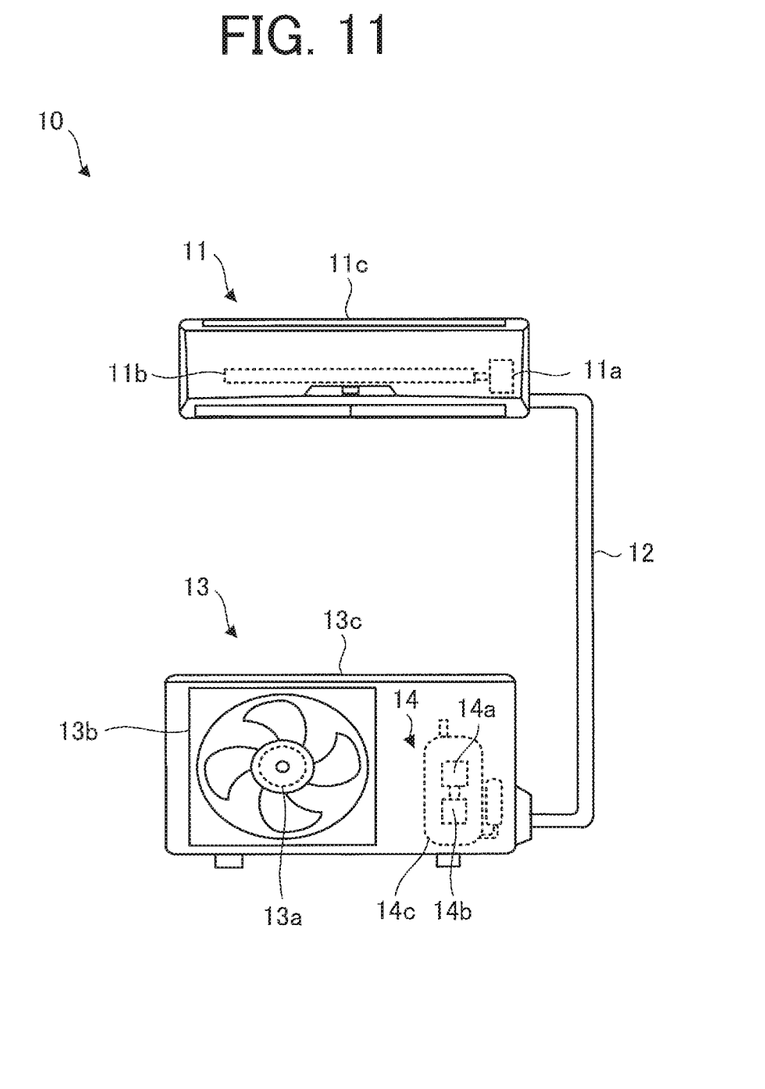
FIG. 11 is a diagram schematically showing a configuration of an air conditioner according to a second embodiment of the present invention.

FIG. 11 is a diagram schematically showing a configuration of the air conditioner 10 according to the second embodiment of the present invention.

The air conditioner 10 according to the second embodiment (e.g., refrigeration air conditioner) includes an indoor unit 11 as a blower (first blower), refrigerant piping 12, and an outdoor unit 13 as a blower (second blower) connected to the indoor unit 11 by the refrigerant piping 12.

The indoor unit 11 includes a motor 11a (e.g., the motor 1 according to the first embodiment), an air blowing section 11b driven by the motor 11a and thereby blows out air, and a housing 11c covering the motor 11a and the air blowing section 11b. The air blowing section 11b includes blades driven by the motor 11a, for example.

The outdoor unit 13 includes a motor 13a (e.g., the motor 1 according to the first embodiment), an air blowing section 13b, a compressor 14, and a heat exchanger (not shown). The air blowing section 13b is driven by the motor 13a and thereby blows out air. The air blowing section 13b includes blades driven by the motor 13a, for example. The compressor 14 includes a motor 14a (e.g., the motor 1 according to the first embodiment), a compression mechanism 14b (e.g., refrigerant circuit) driven by the motor 14a, and a housing 14c covering the motor 14a and the compression mechanism 14b.

In the air conditioner 10 according to the second embodiment, at least one of the indoor unit 11 and the outdoor unit 13 includes the motor 1 described in the first embodiment (including the modification). Specifically, the motor 1 described in the first embodiment is employed for at least one of the motors 11a and 13a as the drive source of the air blowing section. Further, the motor 1 described in the first embodiment (including the modification) may be employed as the motor 14a of the compressor 14.

The air conditioner 10 is capable of performing operations such as a cooling operation for blowing out cool air from the indoor unit 11 or a heating operation for blowing out warm air from the indoor unit 11, for example. In the indoor unit 11, the motor 11a is the drive source for driving the air blowing section 11b. The air blowing section 11b is capable of blowing out conditioned air.

In the air conditioner 10 according to the second embodiment, the motor 1 described in the first embodiment (including the modification) is employed for at least one of the motors 11a and 13a, and thus advantages similar to those described in the first embodiment can be obtained. Accordingly, failure of the air conditioner 10 caused by heat generation in a motor can be prevented. Further, the cost for the air conditioner 10 can be reduced by employing the motor 1 described in the first embodiment for the air conditioner 10.

Furthermore, by employing the motor 1 according to the first embodiment (including the modification) as the drive source of a blower (e.g., the indoor unit 11), advantages similar to those described in the first embodiment can be obtained. Accordingly, failure of the blower caused by heat generation in a motor can be prevented.

Moreover, by employing the motor 1 according to the first embodiment (including the modification) as the drive source of the compressor 14, advantages similar to those described in the first embodiment can be obtained. Accordingly, failure of the compressor 14 caused by heat generation in a motor can be prevented.

The motor 1 described in the first embodiment can be installed in not only the air conditioner 10 but also other types of devices including a drive source, such as ventilating fans, home electric appliances and machine tools.

Features in each embodiment and features in the modification which have been described above can be appropriately combined together.

What is claimed is:

1. A motor comprising:
    a rotor;
    a stator assembly including a stator and a printed circuit board;
    a heat radiation member to radiate heat of the stator assembly; and
    a resin integrating the printed circuit board with the stator and integrating the heat radiation member with the stator assembly.

2. The motor according to claim 1, wherein the heat radiation member touches the stator assembly.

3. The motor according to claim 1, wherein the stator assembly includes
    a drive element fixed on a surface of the printed circuit board and to control rotation of the rotor.

4. The motor according to claim 3, wherein
    the drive element is fixed on the surface of the printed circuit board so as to face the stator.

5. The motor according to claim 3, wherein the stator assembly includes a heat radiation auxiliary member arranged between the heat radiation member and the printed circuit board, the heat radiation auxiliary member transmitting heat of the stator assembly to the heat radiation member.

6. The motor according to claim 3, wherein
    the stator assembly includes a first metallic wiring pattern formed on a first surface of the printed circuit board and a second metallic wiring pattern formed on a second surface opposite to the first surface,
    the printed circuit board has a through hole, and
    the first and second metallic wiring patterns are connected to each other with the through hole in between.

7. The motor according to claim 3, wherein the printed circuit board is integrated with the heat radiation member by the resin.

8. The motor according to claim 3, wherein the stator assembly includes a stator core and an insulator insulating the stator core electrically.

9. The motor according to claim 8, wherein the insulator includes a fixing part fixing the heat radiation member.

10. The motor according to claim 9, wherein the heat radiation member has an attachment hole engaging with the fixing part.

11. The motor according to claim 10, wherein the printed circuit board has a positioning hole engaging with the fixing part.

12. The motor according to claim 11, wherein the fixing part includes a projection inserted in the attachment hole and the positioning hole.

13. The motor according to claim 1, wherein a part of the heat radiation member is exposed outside the resin.

14. The motor according to claim 1, wherein the heat radiation member includes a flange engaging with the resin.

15. The motor according to claim 1, further comprising a cover having an opening, the cover covering the heat radiation member.

16. A blower comprising:
    a motor; and
    an air blowing section driven by the motor,
    wherein the motor includes:
    a rotor;
    a stator assembly including a stator and a printed circuit board;
    a heat radiation member to radiate heat of the stator assembly; and
    a resin integrating the printed circuit board with the stator and integrating the heat radiation member with the stator assembly.

17. An air conditioner comprising:
    an indoor unit; and
    an outdoor unit connected to the indoor unit, wherein
    at least one of the indoor unit and the outdoor unit includes a motor, and
    the motor includes:
    a rotor;
    a stator assembly including a stator and a printed circuit board;
    a heat radiation member to radiate heat of the stator assembly; and
    a resin integrating the printed circuit board with the stator and integrating the heat radiation member with the stator assembly.

18. A method of producing a motor having a rotor, a stator assembly, and a heat radiation member to radiate heat of the stator assembly, the method comprising:
    a step of producing the rotor;
    a step of producing the stator assembly;
    a step of inserting the rotor inside the stator assembly; and
    a step of integrating the heat radiation member with the stator assembly by using a resin wherein
    the stator assembly includes a stator and a printed circuit board, the printed circuit board being integrated with the stator by the resin.

19. The method of producing a motor according to claim 18, wherein the step of integrating the heat radiation member with the stator assembly includes a step of injecting material of the resin into an injection hole formed in the heat radiation member.

\* \* \* \* \*